US012665722B2

(12) United States Patent
Liu

(10) Patent No.: US 12,665,722 B2
(45) Date of Patent: Jun. 23, 2026

(54) METHOD AND APPARATUS FOR CONFIGURING PARAMETER, ELECTRONIC DEVICE, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 324 days.

(21) Appl. No.: 18/561,287

(22) PCT Filed: May 20, 2021

(86) PCT No.: PCT/CN2021/095002
§ 371 (c)(1),
(2) Date: Nov. 15, 2023

(87) PCT Pub. No.: WO2022/241742
PCT Pub. Date: Nov. 24, 2022

(65) Prior Publication Data
US 2024/0250794 A1 Jul. 25, 2024

(51) Int. Cl.
*H04L 5/00* (2006.01)
*H04W 72/0446* (2023.01)
(Continued)

(52) U.S. Cl.
CPC ....... *H04L 5/0051* (2013.01); *H04W 72/0446* (2013.01); *H04W 72/1268* (2013.01); *H04W 72/231* (2023.01)

(58) Field of Classification Search
CPC ....... H04L 5/0051; H04L 5/00; H04L 5/0094; H04W 72/0446; H04W 72/1268; H04W 72/231; H04W 24/08
See application file for complete search history.

(56) References Cited

U.S. PATENT DOCUMENTS 10,057,823 B2 * 8/2018 Tabet ................... H04B 17/336
11,101,950 B2 * 8/2021 Manolakos ......... H04L 25/0202
(Continued)

FOREIGN PATENT DOCUMENTS

CN 106559232 A * 4/2017 ........... H04B 7/0645
CN 106961689 A 7/2017
(Continued)

OTHER PUBLICATIONS

3GPP (3GPP TSG RAN WG1 Meeting #102-e, R1-20xxxxxx, E-meeting, Aug. 17-28, 2020, Agenda Item: 8.8.2.1, Aug. 17, 28, 2020; hereinafter 3GPP102) (Year: 2020).*
(Continued)

*Primary Examiner* — Michael A Keller
(74) *Attorney, Agent, or Firm* — Arch & Lake LLP

(57) ABSTRACT
The present disclosure provides a method for configuring a parameter, an electronic device, and a storage medium. The method includes: configuring parameter information for a terminal; where the parameter information includes at least one of the following: a window size of a time window or a demodulation reference signal DMRS bundling size; where the window size indicates a number of first time domain resource units included in the time window; and the DMRS bundling size indicates a number of second time domain resource units bundled with the DMRS; the window size is greater than or equal to the DMRS bundling size.

18 Claims, 3 Drawing Sheets

(51) Int. Cl.
| | |
|---|---|
| *H04W 72/1268* | (2023.01) |
| *H04W 72/231* | (2023.01) |

(56) References Cited

U.S. PATENT DOCUMENTS

| | | | | |
|---|---|---|---|---|
| 11,140,715 | B2 * | 10/2021 | Ly | H04W 74/0833 |
| 11,310,022 | B2 * | 4/2022 | Manolakos | H04L 25/0224 |
| 11,310,836 | B2 * | 4/2022 | MolavianJazi | H04L 5/0044 |
| 11,375,527 | B1 * | 6/2022 | Eyuboglu | H04B 7/15528 |
| 2017/0201361 | A1 | 7/2017 | Xu et al. | |
| 2018/0116000 | A1 * | 4/2018 | Ly | H04W 74/0833 |
| 2019/0069256 | A1 * | 2/2019 | Jung | H04W 56/0015 |
| 2019/0222380 | A1 * | 7/2019 | Manolakos | H04L 25/0224 |
| 2019/0223191 | A1 * | 7/2019 | Kim | H04L 5/00 |
| 2020/0275446 | A1 * | 8/2020 | Kim | H04W 72/02 |
| 2020/0403768 | A1 * | 12/2020 | Manolakos | H04L 25/0224 |
| 2021/0029707 | A1 * | 1/2021 | Xu | H04L 5/0051 |
| 2021/0051707 | A1 * | 2/2021 | Rastegardoost | H04L 5/10 |
| 2021/0298026 | A1 * | 9/2021 | Abotabl | H04L 5/0042 |
| 2022/0225322 | A1 * | 7/2022 | Shim | H04L 1/1858 |
| 2022/0231791 | A1 * | 7/2022 | Sridharan | H04W 72/23 |
| 2022/0248476 | A1 * | 8/2022 | Taherzadeh Boroujeni | |
| | | | | H04L 1/1819 |
| 2022/0360396 | A1 * | 11/2022 | Sridharan | H04L 5/14 |
| 2023/0101476 | A1 * | 3/2023 | Ryu | H04L 5/0051 |
| | | | | 370/329 |
| 2023/0328706 | A1 * | 10/2023 | Cozzo | H04L 5/0094 |
| 2024/0040596 | A1 * | 2/2024 | Sridharan | H04L 5/0012 |
| 2024/0048312 | A1 * | 2/2024 | Ma | H04L 5/0051 |
| 2024/0163011 | A1 * | 5/2024 | Hasegawa | H04L 1/0071 |
| 2024/0259236 | A1 * | 8/2024 | Penna | H04L 27/2601 |
| 2025/0015947 | A9 * | 1/2025 | Hasegawa | H04W 52/281 |
| 2025/0096940 | A1 * | 3/2025 | Sridharan | H04L 5/0051 |

FOREIGN PATENT DOCUMENTS

| | | | | | |
|---|---|---|---|---|---|
| CN | 107371250 | A | * | 11/2017 | H04W 72/23 |
| CN | 113630201 | A | * | 11/2021 | H04B 17/345 |
| CN | 114286445 | A | * | 4/2022 | |
| CN | 114826512 | A | * | 7/2022 | H04L 5/0048 |
| CN | 115134917 | A | * | 9/2022 | H04L 25/0226 |
| CN | 115580934 | A | * | 1/2023 | H04W 72/0446 |
| CN | 116671079 | A | * | 8/2023 | H04L 5/0078 |
| CN | 116711423 | A | * | 9/2023 | H04L 5/0051 |
| CN | 116803172 | A | * | 9/2023 | H04L 1/08 |
| CN | 116918307 | A | * | 10/2023 | H04L 5/00 |
| CN | 117356053 | A | * | 1/2024 | |
| CN | 118488559 | A | * | 8/2024 | H04B 7/18515 |
| CN | 119487938 | A | * | 2/2025 | H04L 5/0051 |
| CN | 119866610 | A | * | 4/2025 | H04B 7/18513 |
| DE | 102024100436 | A1 | * | 7/2024 | H04L 5/0048 |
| EP | 4507227 | A1 | * | 2/2025 | H04L 5/0055 |
| JP | 2018527785 | A5 | * | 6/2019 | |
| JP | 6828003 | B2 | * | 2/2021 | H04W 72/23 |
| JP | 2025156315 | A | * | 10/2025 | |
| KR | 20240038094 | A | * | 3/2024 | H04B 17/328 |
| WO | 2017193878 | A1 | | 11/2017 | |
| WO | WO-2019022456 | A2 | * | 1/2019 | H04W 72/1273 |
| WO | WO-2020252622 | A1 | * | 12/2020 | H04L 5/0094 |
| WO | WO-2022212234 | A1 | * | 10/2022 | H04L 1/08 |
| WO | WO-2023014110 | A1 | * | 2/2023 | H04W 72/0446 |
| WO | WO-2023027629 | A2 | * | 3/2023 | H04W 72/0446 |
| WO | WO-2023051450 | A1 | * | 4/2023 | H04W 72/23 |
| WO | WO-2023053393 | A1 | * | 4/2023 | H04L 5/0053 |
| WO | WO-2023055026 | A1 | * | 4/2023 | H04W 52/325 |
| WO | WO-2024036088 | A1 | * | 2/2024 | H04L 5/0091 |
| WO | WO-2024065413 | A1 | * | 4/2024 | H04L 5/0051 |
| WO | WO-2024168947 | A1 | * | 8/2024 | H04W 8/22 |

OTHER PUBLICATIONS

3GPP (3GPP TSG RAN WG1 #104-e, R1-2101813, e-Meeting, Jan. 25-Feb. 5, 2021, Agenda item: 8.8.2, 2021; hereinafter 3GPP813) (Year: 2021).*

NPL Learning-aided joint time-frequency channel estimation for 5G new radio, Nitin Jonathan Myers, 2021 (Year: 2021).*

NPL Deep Learning at the Edge for Channel Estimation in Beyond-5G Massive MIMO, Mauro Belgiovine, 2021 (Year: 2021).*

NPL 5G synchronization requirements and solutions, Stefano Ruffini, 2021 (Year: 2021).*

NPL 5G-Advanced: Expanding 5G for the connected world, Nokia White Paper, 2023 (Year: 2023).*

NPL 5G UE Measurements and Reporting, Devopedia, 2021 (Year: 2021).*

NPL ETSI TS 138 306 V17.1.0 (Aug. 202) 5G; NR; User Equipment (UE) radio access capabilities (3GPP TS 38.306 version 17.1.0 Release 17), 2022 (Year: 2022).*

NPL 3GPP TSG RAN WG1 #102-e, R1-2005898, e-Meeting, Aug. 18-28, 2020 (Year: 2020).*

NPL 3GPP TSG RAN WG1 #104-e, R1-2101813, e-Meeting, Jan. 25-Feb. 5, 2021 Agenda item: 8.8.2, 2021 (Year: 2021).*

NPL 5G New Radio: Unveiling the Essentials of the Next Generation Wireless Access Technology Xingqin Lin 2018 (Year: 2018).*

NPL ETSI TS 138 211 V16.2.0 (Jul. 2020), 5G; NR; Physical channels and modulation (3GPP TS 38.211 version 16.2.0 Release 16), 2020 (Year: 2020).*

NPL ETSI TS 138 212 V16.2.0 (Jul. 2020), 5G; NR; Multiplexing and channel coding (3GPP TS 38.212 version 16.2.0 Release 16), 2020 (Year: 2020).*

NPL 3GPP TS 38.331 V15.13.0 (Mar. 2021), Technical Specification, 3rd Generation Partnership Project; Technical Specification Group Radio Access Network; NR; Radio Resource Control (RRC) protocol specification, (Release 15), 2021 (Year: 2021).*

Guo (5G NR Uplink Coverage Enhancement Based on DMRS Bundling and Multi-slot Transmission, Zhiliang Guo, Date Added to IEEE Xplore: Dec. 24, 2020; hereinafter NPL1). (Year: 2020).*

International Search Report of PCT/CN2021/095002 dated Feb. 15, 2022 with English translation, (4p).

Xiaomi, "Joint channel estimation for PUSCH", 3GPP TSG RAN WG1 #105-e, R1-2105577, e-Meeting, May 10-27, 2021, (5p).

Intel Corporation, "Discussion on joint channel estimation for PUSCH", 3GPP TSG RAN WG1 #105-e, R1-2104921, e-Meeting, May 10-27, 2021, (7p).

ZTE Corporation, "Discussion on joint channel estimation for PUSCH", 3GPP TSG RAN WG1 #105-e, R1-2104332, e-Meeting, May 10-27, 2021, (11p).

CNOA issued in Application No. 202180001480.1 dated Jun. 25, 2025 with English translation, (16p).

Vivo, "Discussion on Joint channel estimation for PUSCH", 3GPP TSG RAN WG1 #105-e, R1-2104378, e-Meeting, May 10-27, 2021, (12p).

* cited by examiner configuring parameter information for a terminal; wherein the parameter information includes at least one of the following: a window size of a time window or a demodulation reference signal DMRS bundling size                                101 determining parameter information configured by a network device; wherein the parameter information includes at least one of the following: a window size of a time window or a demodulation reference signal DMRS bundling size

501 parameter information configuration module
601 parameter information determination module
701

METHOD AND APPARATUS FOR CONFIGURING PARAMETER, ELECTRONIC DEVICE, AND STORAGE MEDIUM

CROSS-REFERENCE

The present application is a U.S. national phase application of International Application No. PCT/CN2021/095002, filed on May 20, 2021, the entire content of which is incorporated herein by reference for all purposes.

TECHNICAL FIELD

The present disclosure relates to a field of mobile communication technology, and more particularly, to a method and an apparatus for configuring a parameter, an electronic device, and a storage medium.

BACKGROUND

Under a joint channel estimation solution for a Control Element (CE) project of a New Radio technology of a fifth-generation mobile communication technology (5th Generation New Radio, 5G NR), an application scenario for joint channel estimation of Physical Uplink Shared Channel (PUSCH) is proposed. In the application scenario of joint channel estimation, a concept of time window or time domain window is introduced, and in the same time window, a terminal (user equipment, UE) needs to ensure power consistency and phase continuity. Thus, a network side needs to configure parameter information related to the time window for the UE, so as to ensure the power consistency and the phase continuity.

SUMMARY

Embodiments of the present disclosure disclose a method for configuring a parameter, in order to provide a manner for configuring parameter information related to time window for a UE.

In an aspect, embodiments of the present disclosure disclose a method for configuring a parameter, and the method includes:

configuring parameter information for a terminal; where the parameter information includes at least one of the following: a window size of a time window or a demodulation reference signal DMRS bundling size;

where the window size indicates a number of first time domain resource units included in the time window; and the DMRS bundling size indicates a number of second time domain resource units bundled with the DMRS;

the window size is greater than or equal to the DMRS bundling size.

In another aspect, embodiments of the present disclosure disclose a method for determining a parameter, and the method includes:

determining parameter information configured by a network device;

where the parameter information includes at least one of the following: a window size of a time window or a demodulation reference signal DMRS bundling size;

where the window size indicates a number of first time domain resource units included in the time window;

and the DMRS bundling size indicates a number of second time domain resource units bundled with the DMRS;

the window size is greater than or equal to the DMRS bundling size.

Embodiments of the present disclosure also disclose an electronic device, which includes: a memory, a processor, and a computer program stored in the memory and capable of running on the processor, where when the computer program is executed by the processor, the processor implements one or more method as described in the embodiment of the present disclosure.

Embodiments of the present disclosure also disclose a computer-readable storage medium storing a computer program, where when being executed by a processor, the program implements one or more method as described in the embodiment of the present disclosure.

In the embodiments of the present disclosure, the parameter information is configured for the terminal, and the parameter information includes at least one of the window size of the time window and the DMRS bundling size, such that the UE ensures the power consistency and the phase continuity within the same time window, thereby avoiding occurrence of a situation in which the phase continuity of joint channel estimation being destroyed.

Additional aspects and advantages of the present disclosure will be given in part in the following description, become apparent in part from the following description, or be learned by practice of the present disclosure.

BRIEF DESCRIPTION OF THE DRAWINGS

In order to more clearly illustrate the technical solutions in the embodiments of the present disclosure, drawings used in the description of the embodiments are briefly described below. It is obvious that the drawings below are just refers to some embodiments of the present disclosure, and other drawings may also be obtained for those skilled in the art based on these drawings without paying any creative effort.

DETAILED DESCRIPTION

Figures 1, 2, 3:
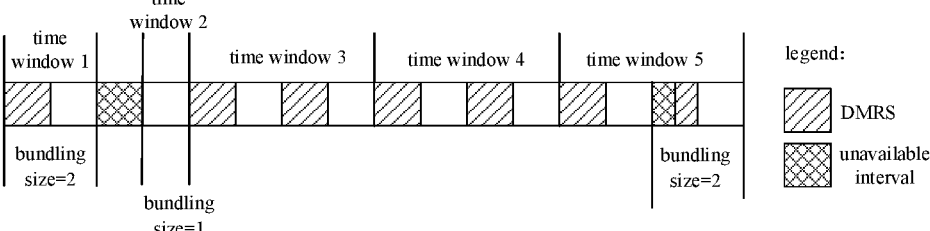
FIG. 1 is a flowchart of a method for configuring a parameter provided in an embodiment of the present disclosure.
FIG. 2 is a schematic diagram of a first example of the embodiments of the present disclosure.
FIG. 3 is a schematic diagram of a second example of the embodiments of the present disclosure.

The term "and/or" in embodiments of the present disclosure describes an association relationship for describing associated objects and represents that three relationships may exist. For example, A and/or B may represent the following three cases: only A exists, both A and B exist, and only B exists. The character "/" usually indicates an "or" relationship between the associated objects.

The term "a plurality of" in the embodiments of the present disclosure indicates two or more than two, and another quantifier is similar to this.

Technical solutions in the embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

The embodiments of the present disclosure discloses a method and an apparatus for configuring a parameter, a method and an apparatus for determining a parameter, a terminal, and a network device, to provide a manner for configuring parameter information related to a time window for UE.

The method and the apparatus are based on a same disclosure concept. Because a problem-resolving principle of the method is similar to that of the apparatus, mutual reference may be made between apparatus implementation and method implementation, and repeated parts are not described.

The technical solutions provided by the embodiments of the present disclosure may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Long Term Evolution Advanced (LTE-A) system, Universal Mobile Telecommunication System (UMTS), Worldwide interoperability for Microwave Access (WiMAX) system, 5G New Radio (NR) system, and the like. These systems all include terminal devices and network devices. A core network part may also be included in the system, such as Evolved Packet System (EPS), 5G System (5GS), and the like.

The terminal device involved in the embodiments of the present disclosure may be a device for providing the voice and/or data connectivity to the user, a handheld device with the wireless connection function, or other processing device connected to the wireless modem, and the like. In different systems, the terminal device may have different names. For example, in a 5G system, the terminal device may be referred to as User Equipment (UE). The wireless terminal device may communicate with one or more Core Networks (CNs) via the Radio Access Network (RAN), and the wireless terminal device may be a mobile terminal, such as a mobile telephone (or called "cellular" telephone), and a computer with the mobile terminal, for example, may be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device may also be called system, subscriber unit, subscriber station, mobile station, mobile, remote station, access point, remote terminal, access terminal, user terminal, user agent, user device, which is not limited in the embodiments of the present disclosure.

The network device involved in the embodiments of the present disclosure may be a base station, which may include a plurality of cells providing services for terminals. Depending on specific application scenarios, the base station may also be called access point, or may be a device in the access network communicating with the wireless terminal via one or more sectors over the air interface, or other names. The network device may be used to exchange the received air frame with the Internet Protocol (IP) packet, and used as the router between the wireless terminal device and the rest of the access network, where the rest of the access network may include IP networks. The network device may further coordinate the attribute management of the air interface. For example, the network device involved in the embodiments of the present disclosure may be a network device (Base Transceiver Station (BTS)) in the Global System of Mobile communication (GSM) or Code Division Multiple Access (CDMA), or may be a network device (NodeB) in the Wideband Code Division Multiple Access (WCDMA), or may be an evolutional network device (evolutional Node B (eNB or e-Nodeb)) in the Long Term Evolution (LTE) system, a 5G base station in the 5G network architecture (next generation system), or may be a Home evolved Node B (HeNB), a relay node, a femtocell (FEMTO), a Pico base station (PICO), and the like, which is not limited in the embodiments of the present disclosure. In some network structures, the network device may include a Centralized Unit (CU) node and a Distributed Unit (DU) node, and the centralized unit and the distributed unit may also be geographically separated.

One or more antennas may be used between the network device and the terminal device for Multi Input Multi Output (MIMO) transmission, which may be Single User MIMO (SU-MIMO) or Multiple User MIMO (MU-MIMO). According to the form and number of antenna combinations, the MIMO transmission may be 2D-MIMO, 3D-MIMO, FD-MIMO or massive-MIMO, or may be diversity transmission or precoding transmission or beamforming transmission, and the like.

As illustrated in FIG. 1, the embodiments of the present disclosure disclose a method for configuring a parameter, in an embodiment, the method may be applied to a network device and may include the following step 101:

in step 101, parameter information is configured for a terminal; where the parameter information includes at least one of the following: a window size of a time window or a demodulation reference signal DMRS bundling size;

the window size indicates a number of first time domain resource units included in the time window; and the DMRS bundling size indicates a number of second time domain resource units bundled with the DMRS;

the window size is greater than or equal to the DMRS bundling size.

The time domain resource unit may be a slot, a sub-slot, and a repetition, and the like, and the time window (Time Window or Time Domain Window) refers to a preset number of time domain resource units. In an embodiment, the parameter information is used for joint channel estimation, where network device configures the parameter information for UE in a manner of an implicit configuration or an explicit configuration, for example, the explicit configuration is a configuration through a signaling message, and the implicit configuration is a configuration bundling to a transmission resource.

The demodulation reference signal (DMRS) bundling size indicates the number of second time domain resource units bundled by the DMRS, i.e., the number of time domain resource units occupied by the transmission of the DMRS. Specifically, the DMRS is usually used for a physical downlink shared channel (PDSCH) demodulation and occupies the same resource area with the PUSCH or a physical uplink control channel (PUCCH). In 5G NR, the DMRS is used for demodulation related to most channels, including a cell specific broadcast channel and a UE specific service channel. At a receiving terminal, by analyzing the DMRS, channel estimation is implemented for a physical layer channel to acquire the characteristics of the physical layer channel.

The window size and the DMRS bundling size may be independently configured, and the window size is greater than or equal to the DMRS bundling size, thereby ensuring that the premise of power consistency and phase continuity for the joint channel estimation transmission may be met. The parameter information includes at least one of the window size of the time window or the demodulation reference signal DMRS bundling size. Specifically, if the window size is equal to the DMRS bundling size, one of the window size or the DMRS bundling size may be configured for the UE or through a protocol by the network device; if the window size is greater than the DMRS bundling size, the window size and the DMRS bundling size are respectively configured for the UE by the network device; or, a mapping relationship between the two is agreed upon according a standard, and one size may be obtained based on the other size according to the mapping relationship.

As a first example, as illustrated in FIG. 2, a schematic diagram of a time window and a DMRS bundling size is shown, where the window size is 4 (4 time domain resource units) and the DMRS bundling size is 2.

In the embodiments of the present disclosure, parameter information is configured for the terminal, and the parameter information includes at least one of the window size of the time window and the DMRS bundling size, such that the UE ensures the power consistency and the phase continuity within the same time window, thereby avoiding occurrence of a situation in which the phase continuity of joint channel estimation being destroyed.

As an embodiment, the embodiments of the present disclosure may be applied to the following scenarios:

scenario 1, back-to-back PUSCH transmission within the same slot;

scenario 2, non-back-to-back PUSCH transmission within the same slot;

scenario 3, back-to-back PUSCH transmission across consecutive slots;

scenario 4, non-back-to-back PUSCH transmission across consecutive slots;

scenario 5, PUSCH transmission across non-consecutive slots and other scenarios.

where the back-to-back transmission refers to the continuous transmission of two PUSCHs.

It may be understood that the embodiments of the present disclosure may also be applied to other scenarios, which is not limited herein.

In an embodiment, after configuring the parameter information for the terminal, the method includes at least one of the following:

in manner 1: the parameter information is sent to the terminal through a preset signaling message; and in manner 2: the parameter information is set in correspondence with a resource parameter of a preset transmission resource and/or the preset transmission resource.

The manner 1 adopts the manner of the explicit configuration, and the parameter information is carried in the preset signaling message; for example, when an RRC signaling message is sent, the window size and the DMRS bundling size are indicated to the UE, or when an MAC-CE signaling message and a DCI signaling message are sent, the window size and the DMRS bundling size are indicated to the UE. In this way, UE acquires the parameter information from the above signaling messages when receiving them. The manner 2 adopts the manner of the implicit configuration, and a corresponding relationship of the parameter information with the preset transmission resource and/or the resource parameter is preset; for example, the network device preconfigures the corresponding relationship: for PUSCH resource 1, the corresponding window size is 4 and the DMRS bundling size is 2; for PUSCH resource 2, the corresponding window size is 6 and the DMRS bundling size is 4; thus when the UE transmits the PUSCH resource 1, it is determined that the window size is 4 and the DMRS bundling size is 2 according to the corresponding relationship; and when the UE transmits the PUSCH resource 2, it is determined that the window size is 6 and the DMRS bundling size is 4 according to the corresponding relationship. In addition, it may also be configured according to the resource parameter, for example, for a transmission resource with a Repetition number of 16, it may be ¼ of the Repetition number. For example, if the Repetition number is 16, the time window may be 4; or according to a frequency hopping interval, the corresponding time window may be defaulted to be equal to the frequency hopping interval; according to a TDD frame structure ratio, for consecutive uplink slots with no more than N consecutive slots, the default is one time window.

In an embodiment, the preset signaling message includes at least one of the following:

a radio resource control RRC layer signaling message, a media access control-control element MAC-CE signaling message, or a downlink control information DCI signaling message.

The network device may send the parameter information to the UE through the preset signaling message (a high-level signaling or a physical layer signaling), and the preset signaling message includes such as the Radio Resource Control (RRC) layer signaling message, the Medium Access Control-Control Element (MAC-CE) signaling message, and the Downlink Control Information (DCI) signaling message, and the like.

In an embodiment, the sending the parameter information to the terminal through the preset signaling message includes:

carrying the parameter information in a target indication domain in the preset signaling message, and sending the preset signaling message to the terminal; where the target indication domain includes at least one of a preset indication domain or a newly-added indication domain.

The preset indication domain refers to, in the preset signaling message, reusing an existing indication domain to carry the parameter information, such as reusing a PRI domain, reusing a power control domain, and the like; the newly-added indication domain refers to adding a new indication domain into the preset signaling message to carry the parameter information, for example, in the RRC message, a 1-bit data is newly added to indicate the parameter information.

In an embodiment, the preset transmission resource includes at least one of a physical uplink control channel PUCCH resource and a physical uplink shared channel PUSCH resource. Taking the PUSCH resource as an example, the network device pre-configures the parameter information corresponding to the PUSCH resource, such that the UE, when transmitting the PUSCH resource, transmits the PUSCH resource according to the pre-configured parameter information. For example, for the PUSCH resource 1, the corresponding window size is 4, and the DMRS bundling size is 2; for the PUSCH resource 2, the corresponding window size is 6, and the DMRS bundling size is 4.

In an embodiment, the resource parameter of the preset transmission resource includes at least one of the following: a repetition parameter Repetition, a time-domain frequency hopping interval, or an uplink-downlink slot structure configuration. For a data packet that is repeatedly transmitted on a plurality of consecutive transmission resources, the receiving terminal combines the data on the plurality of transmission resources to improve the transmission quality; the time-domain frequency hopping interval indicates the frequency hopping interval when the resource is transmitted; and the network side may also bundle the resource parameter of the preset transmission resource with the parameter information.

In an embodiment, the parameter information also includes first indication information;

the first indication information indicates that the terminal, when there is an unavailable interval in the time window, if duration of the unavailable interval is greater than or equal to a first preset threshold, divides the time window into at least two time sub-windows.

When there is an unavailable interval in the time window, for example, due to a factor such as a slot format indicator (SFI), a cancel indicator (CI), and different priorities of PUSCHs, there is an unavailable symbol or slot (there is a non-consecutive slot or symbol) in the time window, for example, in several scenarios, such as in the above scenario 2 (non-back-to-back PUSCH transmission within the same slot), the scenario 4 (non-back-to-back PUSCH transmission across consecutive slots) and the scenario 5 (PUSCH transmission across non-consecutive slots), when there is the unavailable symbol or slot, the UE may place its power amplifier (PA) module in an energy-saving state, and thus, due to the unavailable symbol or slot, random phase rotation is introduced to the PA state switching between the non-back-to-back PUSCH transmissions, which may destroy the phase continuity of the joint channel estimation, and the defined time window also needs to be divided or changed accordingly. Thus, in the embodiments of the present disclosure, the network device carries the first indication information in the parameter information, indicating that when there is the unavailable interval in the time window, if the duration of the unavailable interval is greater than or equal to the first preset threshold, the time window is divided into at least two time sub-windows, i.e., the original time window is used as a nominal time window (nominal), and the divided time sub-window is used as an actual time window (actual).

As a second example, referring to FIG. 2, if there is an unavailable interval in a time window 2, and if the duration of the unavailable interval is greater than or equal to the first preset threshold, the existing window is automatically divided, the time window 1 (the nominal window 1) corresponds to the slot with the original window size of 4 in FIG. 2, and the nominal window 1 is segmented into the actual window 1 (the time window 1) and the actual window 2 (the time window 2), as illustrated in FIG. 3; if the duration of the unavailable interval is less than the first preset threshold, the window is not segmented. For a time window 5, although there is an available interval, the original window remains unchanged.

In an embodiment, the first indication information further indicates that after dividing the time window into at least two time sub-windows, if a window size of the time sub-window is smaller than the DMRS bundling size, the DMRS bundling size is the configured DMRS bundling size, and the DMRS bundling size is adjusted to the window size of the time sub-window. That is, if the window size of the divided time sub-window is smaller than the DMRS bundling size, the DMRS bundling size is adjusted, such that the DMRS bundling size is reduced to the window size of the time sub-window, so as to ensure that the DMRS bundling may meet the power consistency and the phase continuity.

Referring to FIG. 3, for the adjusted time window 2, if the window size N is smaller than the DMRS bundling size M, M is adjusted to N. As illustrated in FIGS. 2 to 3, a size of the original time window is 4 and the bundling size is 2, after the division, the size of the time window 2 as a time sub-window is reduced to 1, then the DMRS bundling size is also adjusted to 1, and that is, the corresponding DMRS bundling size in the time window 2 is reduced, as illustrated in the drawing, the bundling size=1.

In an embodiment, the first indication information further indicates that the terminal, if there is no available DMRS symbol in the time sub-window, supplements and transmits the DMRS in a preset time domain resource unit in the time sub-window after adjusting the DMRS bundling size to the window size of the time sub-window.

Usually, DMRSs are distributed on each slot or each repetition transmission, due to the joint channel estimation, a DMRS density may be reduced, and the DMRS transmission may be omitted on some repetitions or some of the slots. In this case, for the existing time window and the DMRS bundling size, if there is an unavailable symbol or slot due to the SFI, the CI, or different priority preemptions, and the unavailable symbol or slot happens to occur at the position of the original DMRS symbol or on a slot containing the DMRS, resulting in that there is no available DMRS symbol in the divided time sub-window, at this time, it is necessary to supplement the DMRS, and the DMRS is supplemented and transmitted on the preset time domain resource unit in the time sub-window.

Figures 4, 5, 6, 7:
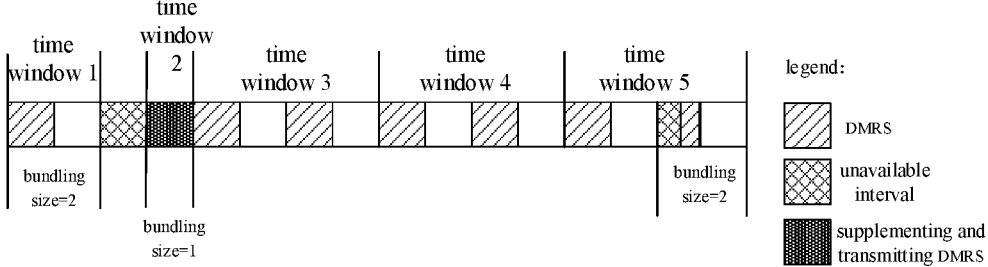
FIG. 4 is a schematic diagram of a third example of the embodiments of the present disclosure.
FIG. 5 is a flowchart of a method for determining a parameter provided in an embodiment of the present disclosure.
FIG. 6 is a structural schematic diagram of an apparatus for configuring a parameter provided in an embodiment of the present disclosure.
FIG. 7 is a structural schematic diagram of an apparatus for determining a parameter provided in an embodiment of the present disclosure.

As a third example, combined with FIG. 4, there is no available DMRS in the adjusted time window 2, and thus it is necessary to supplement and transmit the DMRS, as illustrated in drawing in the slot for supplementing and transmitting the DMRS; in the time window 5, the unavailable interval does not affect the original available DMRS, and thus it is unnecessary to supplement and transmit the DMRS.

In an embodiment, the preset time domain resource unit includes a first time domain resource unit or a second time domain resource unit;

the first time domain resource unit includes a preset symbol position of a target DMRS transmitted; and the preset symbol position is, for example, a starting position, an ending position, a middle position, and the like within a range of the DMRS bundling size;

the second time domain resource unit includes a position where a M-th symbol of the target DMRS transmitted is offset by N symbol positions; where M and N are positive integers, and that is, the network device configures an offset position of the DMRS for supplementation and transmission; for example, if M=0 and N=5, the DMRS is inserted at the 5th position of the 0th symbol.

In an embodiment, configuration information of the preset time domain resource unit is sent to the terminal through at least one of the following: an RRC signaling message, a MAC-CE signaling message, or a DCI signaling message.

In the embodiments of the present disclosure, the parameter information is configured for the terminal, and the parameter information includes at least one of the window size of the time window and the DMRS bundling size, such that the UE ensures the power consistency and the phase continuity within the same time window, thereby avoiding occurrence of a situation in which the phase continuity of joint channel estimation being destroyed.

Referring to FIG. 5, the embodiments of the present disclosure also disclose a method for determining a parameter, which may be applied to a terminal, and the method includes step 501:

in step 501, parameter information configured for a network device is determined;

where the parameter information includes at least one of the following: a window size of a time window or a demodulation reference signal DMRS bundling size;

the window size indicates a number of first time domain resource units included in the time window; and the DMRS bundling size indicates a number of second time domain resource units bundled with the DMRS;

the window size is greater than or equal to the DMRS bundling size.

The time domain resource unit may be a slot, a sub-slot, and a repetition, and the like, and the time window (Time Window or Time Domain Window) refers to a preset number of time domain resource units. In an embodiment, the parameter information is used for joint channel estimation, where network device configures the parameter information for UE in a manner of an implicit configuration or an explicit configuration, for example, the explicit configuration is a configuration through a signaling message, and the implicit configuration is a configuration bundling to a transmission resource. Accordingly, the UE may acquire the parameter information in a manner of configuration of the network device.

The demodulation reference signal (DMRS) bundling size indicates the number of second time domain resource units bundled by the DMRS, i.e., the number of time domain resource units occupied by the transmission of the DMRS. Specifically, the DMRS is usually used for a physical downlink shared channel (PDSCH) demodulation and occupies the same resource area with the PUSCH or a physical uplink control channel (PUCCH). In 5G NR, the DMRS is used for demodulation related to most channels, including a cell specific broadcast channel and a UE specific service channel. At a receiving terminal, by analyzing the DMRS, channel estimation is implemented for a physical layer channel to acquire the characteristics of the physical layer channel.

The window size and the DMRS bundling size may be independently configured, and the window size is greater than or equal to the DMRS bundling size, thereby ensuring that the premise of power consistency and phase continuity for the joint channel estimation transmission may be met.

The parameter information includes at least one of the window size of the time window or the demodulation reference signal DMRS bundling size. Specifically, if the window size is equal to the DMRS bundling size, one of the window size or the DMRS bundling size may be configured for the UE or through a protocol by the network device; if the window size is greater than the DMRS bundling size, the window size and the DMRS bundling size are respectively configured for the UE by the network device; or, a mapping relationship between the two is agreed upon according a standard, and one size may be obtained based on the other size according to the mapping relationship.

As a fourth example, as illustrated in FIG. 2, a schematic diagram of a time window and a DMRS bundling size is shown, where the window size is 4 (4 time domain resource units) and the DMRS bundling size is 2, where different fill patterns represent one DMRS.

In the embodiment of the present disclosure, the parameter information configured by the network device is determined, and subsequently, at least one of the window size of the time window and the DMRS bundling size included in the parameter information is transmitted based on the parameter information, such that the UE ensures the power consistency and the phase continuity within the same time window, thereby avoiding occurrence of a situation in which the phase continuity of joint channel estimation being destroyed.

In an embodiment, determining the parameter information configured by the network device includes at least one of the following:

in manner 3: the parameter information sent by the network device is received through a preset signaling message; and in manner 4: the parameter information is determined in correspondence with a resource parameter of a preset transmission resource and/or the preset transmission resource.

The manner 3 adopts the manner of the explicit configuration, the UE receives the parameter information from the preset signaling message; for example, when an RRC signaling message is sent, the window size and the DMRS bundling size are indicated to the UE, or when an MAC-CE signaling message and a DCI signaling message are sent, the window size and the DMRS bundling size are indicated to the UE. In this way, UE acquires the parameter information from the above signaling messages when receiving them. The manner 4 adopts the manner of the implicit configuration, the UE determines the parameter information according to a corresponding relationship of the parameter information with the preset transmission resource and/or the resource parameter; for example, the network device preconfigures the corresponding relationship: for PUSCH resource 1, the corresponding window size is 4 and the DMRS bundling size is 2; for PUSCH resource 2, the corresponding window size is 6 and the DMRS bundling size is 4; thus when the UE transmits the PUSCH resource 1, it is determined that the window size is 4 and the DMRS bundling size is 2 according to the corresponding relationship; and when the UE transmits the PUSCH resource 2, it is determined that the window size is 6 and the DMRS bundling size is 4 according to the corresponding relationship. In addition, it may also be configured according to the resource parameter, for example, for a transmission resource with a Repetition number of 16, it may be ¼ of the Repetition number. For example, if the Repetition number is 16, the time window may be 4; or according to a frequency hopping interval, the corresponding time window may be defaulted to be equal to the frequency hopping interval; according to a TDD frame structure ratio, for consecutive uplink slots with no more than N consecutive slots, the default is one time window.

In an embodiment, the preset signaling message includes at least one of the following:

a radio resource control RRC layer signaling message, a media access control-control element MAC-CE signaling message, or a downlink control information DCI signaling message.

The network device may send the parameter information to the UE through the preset signaling message (a high-level signaling or a physical layer signaling), the preset signaling message includes such as the Radio Resource Control (RRC) layer signaling message, the Medium Access Control-Control Element (MAC-CE) signaling message, and the Downlink Control Information (DCI) signaling message, and the like, and the UE acquires the parameter information from the above signaling messages.

In an embodiment, the receiving the parameter information sent by the network device through the preset signaling message includes: acquiring the parameter information carried in a target indication domain in the preset signaling message; where the target indication domain includes at least one of a preset indication domain or a newly-added indication domain.

The preset indication domain refers to, in the preset signaling message, reusing an existing indication domain to carry the parameter information, such as reusing a PRI domain, reusing a power control domain, and the like; the newly-added indication domain refers to adding a new indication domain into the preset signaling message to carry the parameter information, for example, in the RRC message, a 1-bit data is newly added to indicate the parameter information.

In an embodiment, the preset transmission resource includes at least one of a physical uplink control channel PUCCH resource and a physical uplink shared channel PUSCH resource. Taking the PUSCH resource as an example, the network device pre-configures the parameter information corresponding to the PUSCH resource, such that the UE, when transmitting the PUSCH resource, transmits the PUSCH resource according to the pre-configured parameter information. For example, for the PUSCH resource 1, the corresponding window size is 4, and the DMRS bundling size is 2; for the PUSCH resource 2, the corresponding window size is 6, and the DMRS bundling size is 4.

In an embodiment, the resource parameter of the preset transmission resource includes at least one of the following: a repetition parameter Repetition, a time-domain frequency hopping interval, or an uplink-downlink slot structure configuration.

In an embodiment, after determining the parameter information configured by the network device, the method includes the following step, where:

first indication information is received, if there is an unavailable interval in the time window and duration of the unavailable interval is greater than or equal to a first preset threshold, the time window is divided into at least two time sub-windows.

When there is an unavailable interval in the time window, for example, due to a factor such as a SFI, a CI, and different priorities of PUSCHs, there is an unavailable symbol or slot (there is a non-consecutive slot or symbol) in the time window, for example, in several scenarios, such as in the above scenario 2 (non-back-to-back PUSCH transmission within the same slot), the scenario 4 (non-back-to-back PUSCH transmission across consecutive slots) and the scenario 5 (PUSCH transmission across non-consecutive slots), the UE may place its power amplifier (PA) module in an energy-saving state, and thus, due to the unavailable symbol or slot, random phase rotation is introduced to the PA state switching between the non-back-to-back PUSCH transmissions, which may destroy the phase continuity of the joint channel estimation, and the defined time window also needs to be divided or changed accordingly. Thus, in the embodiments of the present disclosure, when the UE receives the first indication information, if there is the unavailable interval in the time window, and the duration of the unavailable interval is greater than or equal to the first preset threshold, the time window is divided into at least two time sub-windows, i.e., the original time window is used as a nominal time window (nominal), and the divided time sub-window is used as an actual time window (actual).

As a fifth example, referring to FIG. 2, if there is an unavailable interval in a time window 2, and if the duration of the unavailable interval is greater than or equal to the first preset threshold, the existing window is automatically divided, the time window 1 (the nominal window 1) corresponds to the slot with the original window size of 4 in FIG. 2, and the nominal window 1 is segmented into the actual window 1 (the time window 1) and the actual window 2 (the time window 2), as illustrated in FIG. 3; if the duration of the unavailable interval is less than the first preset threshold, the window is not segmented. For a time window 5, although there is an available interval, the original window remains unchanged.

In an embodiment, after dividing the time window into the at least two time sub-windows, the method also includes the following step, where:

if a window size of the time sub-window is smaller than the DMRS bundling size, the DMRS bundling size is adjusted to the window size of the time sub-window. That is, if the window size of the divided time sub-window is smaller than the DMRS bundling size, the DMRS bundling size is adjusted, such that the DMRS bundling size is reduced to the window size of the time sub-window, so as to ensure that the DMRS bundling may meet the power consistency and the phase continuity.

Referring to FIG. 3, for the adjusted time window 2, if the window size N is smaller than the DMRS bundling size M, M is adjusted to N. As illustrated in FIGS. 2 to 3, a size of the original time window is 4 and the bundling size is 2, after the division, the size of the time window 2 as a time sub-window is reduced to 1, then the DMRS bundling size is also adjusted to 1, and that is, the corresponding DMRS bundling size in the time window 2 is reduced, as illustrated in the drawing, the bundling size=1.

In an embodiment, after dividing the time window into the at least two time sub-windows, the method also includes the following step, where:

if there is no available DMRS symbol in the time sub-window, a target DMRS is supplemented and transmitted in a preset time domain resource unit Usually, DMRSs are distributed on each slot or each repetition transmission, due to the joint channel estimation, a DMRS density may be reduced, and the DMRS transmission may be omitted on some repetitions or some of the slots. In this case, for the existing time window and the DMRS bundling size, if there is an unavailable symbol or slot due to the SFI, the CI, or different priority preemptions, and the unavailable symbol or slot happens to occur at the position of the original DMRS symbol or on a slot containing the DMRS, resulting in that there is no available DMRS symbol in the divided time sub-window, at this time, it is necessary to supplement the DMRS, and the DMRS is supplemented and transmitted on the preset time domain resource unit in the time sub-window.

As a sixth example, combined with FIG. 4, there is no available DMRS in the adjusted time window 2, and thus it is necessary to supplement and transmit the DMRS, as illustrated in drawing in the slot for supplementing and transmitting the DMRS; in the time window 5, the unavailable interval does not affect the original available DMRS, and thus it is unnecessary to supplement and transmit the DMRS.

In an embodiment, the preset time domain resource unit includes a first time domain resource unit or a second time domain resource unit;

the first time domain resource unit includes a preset symbol position of a target DMRS transmitted; and the preset symbol position is, for example, a starting position, an ending position, a middle position, and the like within a range of the DMRS bundling size;

the second time domain resource unit includes a position where a M-th symbol of the target DMRS transmitted is offset by N symbol positions; where M and N are positive integers, and that is, the network device configures an offset position of the DMRS for supplementation and transmission; for example, if M=0 and N=5, the DMRS is inserted at the 5th position of the 0th symbol.

In an embodiment, configuration information of the preset time domain resource unit is preset or acquired at least one of the following signaling messages sent by the network device: an RRC signaling message, a MAC-CE signaling message, or a DCI signaling message.

In the embodiments of the present disclosure, the parameter information configured by the network device is determined, and subsequently, at least one of the window size of the time window and the DMRS bundling size included in the parameter information is transmitted based on the parameter information, such that the UE ensures the power consistency and the phase continuity within the same time window, thereby avoiding occurrence of a situation in which the phase continuity of joint channel estimation being destroyed.

The embodiments of the present disclosure also provide a method for indicating information, in an embodiment, the method may be applied to a network device, and the method includes the following step, where:

first indication information is sent to a terminal; where the first indication information is configured to indicate that the terminal, when there is an unavailable interval in a time window, if duration of the unavailable interval is greater than a first preset threshold, divides the time window into at least two time sub-windows.

When there is an unavailable interval in the time window, for example, due to a factor such as a slot format indicator (SFI), a cancel indicator (CI), and different priorities of PUSCHs, there is an unavailable symbol or slot (there is a non-consecutive slot or symbol) in the time window, for example, in several scenarios, such as in the above scenario 2 (non-back-to-back PUSCH transmission within the same slot), the scenario 4 (non-back-to-back PUSCH transmission across consecutive slots) and the scenario 5 (PUSCH transmission across non-consecutive slots), when there is the unavailable symbol or slot, the UE may place its power amplifier (PA) module in an energy-saving state, and thus, due to the unavailable symbol or slot, random phase rotation is introduced to the PA state switching between the non-back-to-back PUSCH transmissions, which may destroy the phase continuity of the joint channel estimation, and the defined time window also needs to be divided or changed accordingly. Thus, in the embodiments of the present disclosure, the network device carries the first indication information in the parameter information, indicating that when there is the unavailable interval in the time window, if the duration of the unavailable interval is greater than or equal to the first preset threshold, the time window is divided into at least two time sub-windows, i.e., the original time window is used as a nominal time window (nominal), and the divided time sub-window is used as an actual time window (actual).

As a seventh example, referring to FIG. 2, if there is an unavailable interval in a time window 2, and if the duration of the unavailable interval is greater than or equal to the first preset threshold, the existing window is automatically divided, the time window 1 (the nominal window 1) corresponds to the slot with the original window size of 4 in FIG. 2, and the nominal window 1 is segmented into the actual window 1 (the time window 1) and the actual window 2 (the time window 2), as illustrated in FIG. 3; if the duration of the unavailable interval is less than the first preset threshold, the window is not segmented. For a time window 5, although there is an available interval, the original window remains unchanged.

In an embodiment, if the duration of the unavailable interval is less than the first preset threshold, the terminal is indicated not to adjust the time window; correspondingly, when the duration of the unavailable interval is equal to the first preset threshold, the first indication information may be configured to indicate the terminal to adjust the time window or not to adjust the time window.

In an embodiment, the first indication information further indicates that after dividing the time window into at least two time sub-windows, if a window size of the time sub-window is smaller than the DMRS bundling size, the DMRS bundling size is the configured DMRS bundling size, and the DMRS bundling size is adjusted to the window size of the time sub-window.

That is, if the window size of the divided time sub-window is smaller than the DMRS bundling size, the DMRS bundling size is adjusted, such that the DMRS bundling size is reduced to the window size of the time sub-window, so as to ensure that the DMRS bundling may meet the power consistency and the phase continuity.

Referring to FIG. 3, for the adjusted time window 2, if the window size N is smaller than the DMRS bundling size M, M is adjusted to N. As illustrated in FIGS. 2 to 3, a size of the original time window is 4 and the bundling size is 2, after the division, the size of the time window 2 as a time sub-window is reduced to 1, then the DMRS bundling size is also adjusted to 1, and that is, the corresponding DMRS bundling size in the time window 2 is reduced, as illustrated in the drawing, the bundling size=1.

In an embodiment, the first indication information further indicates that the terminal, if there is no available DMRS symbol in the time sub-window, supplements and transmits the DMRS in a preset time domain resource unit in the time sub-window after adjusting the DMRS bundling size to the window size of the time sub-window.

Usually, DMRSs are distributed on each slot or each repetition transmission, due to the joint channel estimation, a DMRS density may be reduced, and the DMRS transmission may be omitted on some repetitions or some of the slots.

In this case, for the existing time window and the DMRS bundling size, if there is an unavailable symbol or slot due to the SFI, the CI, or different priority preemptions, and the unavailable symbol or slot happens to occur at the position of the original DMRS symbol or on a slot containing the DMRS, resulting in that there is no available DMRS symbol in the divided time sub-window, at this time, it is necessary to supplement the DMRS, and the DMRS is supplemented and transmitted on the preset time domain resource unit in the time sub-window.

As an eighth example, combined with FIG. 4, there is no available DMRS in the adjusted time window 2, and thus it is necessary to supplement and transmit the DMRS, as illustrated in drawing in the slot for supplementing and transmitting the DMRS; in the time window 5, the unavailable interval does not affect the original available DMRS, and thus it is unnecessary to supplement and transmit the DMRS.

In an embodiment, the preset time domain resource unit includes a first time domain resource unit or a second time domain resource unit;

the first time domain resource unit includes a preset symbol position of a target DMRS transmitted; and the preset symbol position is, for example, a starting position, an ending position, a middle position, and the like within a range of the DMRS bundling size;

the second time domain resource unit includes a position where a M-th symbol of the target DMRS transmitted is offset by N symbol positions; where M and N are positive integers, and that is, the network device configures an offset position of the DMRS for supplementation and transmission; for example, if M=0 and N=5, the DMRS is inserted at the 5th position of the 0th symbol.

In an embodiment, configuration information of the preset time domain resource unit is sent to the terminal through at least one of the following: an RRC signaling message, a MAC-CE signaling message, or a DCI signaling message.

In the embodiments of the present disclosure, the first indication information is sent to the terminal, and the first indication information is configured to indicate that the terminal, when there is an unavailable interval in the time window, if the duration of the unavailable interval is greater than the first preset threshold, divides the time window into at least two time sub-windows, so as to ensure the transmission of the DMRS, such that the UE ensures the power consistency and the phase continuity within the same time window, thereby avoiding occurrence of a situation in which the phase continuity of joint channel estimation being destroyed.

The embodiments of the present disclosure also provide a method for receiving information, in an embodiment, the method may be applied to a terminal, and the method includes the following steps, where:

first indication information is received;

in response to the first indication information, if there is an unavailable interval in a time window, and duration of the unavailable interval is greater than a first preset threshold, the time window is divided into at least two time sub-windows.

When there is an unavailable interval in the time window, for example, due to a factor such as a slot format indicator (SFI), a cancel indicator (CI), and different priorities of PUSCHs, there is an unavailable symbol or slot (there is a non-consecutive slot or symbol) in the time window, for example, in several scenarios, such as in the above scenario 2 (non-back-to-back PUSCH transmission within the same slot), the scenario 4 (non-back-to-back PUSCH transmission across consecutive slots) and the scenario 5 (PUSCH transmission across non-consecutive slots), when there is the unavailable symbol or slot, the UE may place its power amplifier (PA) module in an energy-saving state, and thus, due to the unavailable symbol or slot, random phase rotation is introduced to the PA state switching between the non-back-to-back PUSCH transmissions, which may destroy the phase continuity of the joint channel estimation, and the defined time window also needs to be divided or changed accordingly. Thus, in the embodiments of the present disclosure, the network device carries the first indication information in the parameter information, indicating that when there is the unavailable interval in the time window, if the duration of the unavailable interval is greater than or equal to the first preset threshold, the time window is divided into at least two time sub-windows, i.e., the original time window is used as a nominal time window (nominal), and the divided time sub-window is used as an actual time window (actual).

As a ninth example, referring to FIG. 2, if there is an unavailable interval in a time window 2, and if the duration of the unavailable interval is greater than or equal to the first preset threshold, the existing window is automatically divided, the time window 1 (the nominal window 1) corresponds to the slot with the original window size of 4 in FIG. 2, and the nominal window 1 is segmented into the actual window 1 (the time window 1) and the actual window 2 (the time window 2), as illustrated in FIG. 3; if the duration of the unavailable interval is less than the first preset threshold, the window is not segmented. For a time window 5, although there is an available interval, the original window remains unchanged.

In an embodiment, if the duration of the unavailable interval is less than the first preset threshold, the terminal doe not to adjust the time window; correspondingly, when the duration of the unavailable interval is equal to the first preset threshold, the terminal adjusts the time window or does not adjust the time window.

In an embodiment, after the time window is divided into at least two time sub-windows, the method also includes that:

if a window size of the time sub-window is smaller than the DMRS bundling size, the DMRS bundling size is the configured DMRS bundling size, and the DMRS bundling size is adjusted to the window size of the time sub-window.

That is, if the window size of the divided time sub-window is smaller than the DMRS bundling size, the DMRS bundling size is adjusted, such that the DMRS bundling size is reduced to the window size of the time sub-window, so as to ensure that the DMRS bundling may meet the power consistency and the phase continuity.

Referring to FIG. 3, for the adjusted time window 2, if the window size N is smaller than the DMRS bundling size M, M is adjusted to N. As illustrated in FIGS. 2 to 3, a size of the original time window is 4 and the bundling size is 2, after the division, the size of the time window 2 as a time sub-window is reduced to 1, then the DMRS bundling size is also adjusted to 1, and that is, the corresponding DMRS bundling size in the time window 2 is reduced, as illustrated in the drawing, the bundling size=1.

In an embodiment, embodiment after the time window is divided into at least two time sub-windows, the method also includes that:

if there is no available DMRS symbol in the time sub-window, a target DMRS is supplemented and transmitted in a preset time domain resource unit in the time sub-window.

Usually, DMRSs are distributed on each slot or each repetition transmission, due to the joint channel estimation, a DMRS density may be reduced, and the DMRS transmission may be omitted on some repetitions or some of the slots. In this case, for the existing time window and the DMRS bundling size, if there is an unavailable symbol or slot due to the SFI, the CI, or different priority preemptions, and the unavailable symbol or slot happens to occur at the position of the original DMRS symbol or on a slot containing the DMRS, resulting in that there is no available DMRS symbol in the divided time sub-window, at this time, it is necessary to supplement the DMRS, and the DMRS is supplemented and transmitted on the preset time domain resource unit in the time sub-window.

As an tenth example, combined with FIG. 4, there is no available DMRS in the adjusted time window 2, and thus it is necessary to supplement and transmit the DMRS, as illustrated in drawing in the slot for supplementing and transmitting the DMRS; in the time window 5, the unavailable interval does not affect the original available DMRS, and thus it is unnecessary to supplement and transmit the DMRS.

In an embodiment, the preset time domain resource unit includes a first time domain resource unit or a second time domain resource unit;

the first time domain resource unit includes a preset symbol position of a target DMRS transmitted; and the preset symbol position is, for example, a starting position, an ending position, a middle position, and the like within a range of the DMRS bundling size;

the second time domain resource unit includes a position where a M-th symbol of the target DMRS transmitted is offset by N symbol positions; where M and N are positive integers, and that is, the network device configures an offset position of the DMRS for supplementation and transmission; for example, if M=0 and N=5, the DMRS is inserted at the 5th position of the 0th symbol.

In an embodiment, configuration information of the preset time domain resource unit is sent to the terminal through at least one of the following: an RRC signaling message, a MAC-CE signaling message, or a DCI signaling message.

In the embodiments of the present disclosure, the first indication information is received and responded, when there is an unavailable interval in the time window, if the duration of the unavailable interval is greater than the first preset threshold, the UE divides the time window into at least two time sub-windows, so as to ensure the transmission of the DMRS, such that the UE ensures the power consistency and the phase continuity within the same time window, thereby avoiding occurrence of a situation in which the phase continuity of joint channel estimation being destroyed.

Based on the same principle as the method provided in the embodiments of the present disclosure, the embodiments of the present disclosure also disclose an apparatus for configuring a parameter, as illustrated in FIG. 6, and the apparatus includes:

a parameter information configuration module 601, configured to configure parameter information for a terminal; where the parameter information includes at least one of the following: a window size of a time window or a demodulation reference signal DMRS bundling size;

the window size indicates a number of first time domain resource units included in the time window; and the DMRS bundling size indicates a number of second time domain resource units bundled with the DMRS;

the window size is greater than or equal to the DMRS bundling size.

In an embodiment, after configuring the parameter information for the terminal, the apparatus performs at least one of the following:

sending the parameter information to the terminal through a preset signaling message;

and setting the parameter information in correspondence with a resource parameter of a preset transmission resource and/or the preset transmission resource.

In an embodiment, the preset signaling message includes at least one of the following:

a radio resource control layer RRC signaling message, a media access control-control element MAC-CE signaling message, or a downlink control information DCI signaling message.

In an embodiment, the parameter configuration module is further configured to:

carry the parameter information in a target indication domain in the preset signaling message, and send the preset signaling message to the terminal; where the target indication domain includes at least one of a preset indication domain or a newly-added indication domain.

In an embodiment, the preset transmission resource includes at least one of a physical uplink control channel PUCCH resource or a physical uplink shared channel PUSCH resource.

In an embodiment, the resource parameter of the preset transmission resource includes at least one of the following: a repetition parameter Repetition, a time-domain frequency hopping interval, or an uplink-downlink slot structure configuration.

In an embodiment, the parameter information further includes first indication information;

where the first indication information indicates that the terminal, when there is an unavailable interval in the time window, if duration of the unavailable interval is greater than or equal to a first preset threshold, divides the time window into at least two time sub-windows.

In an embodiment, the first indication information further indicates that the terminal, if a window size of the time sub-window is smaller than the DMRS bundling size, adjusts the DMRS bundling size to the window size of the time sub-window after dividing the time window into the at least two time sub-windows.

In an embodiment, the first indication information further indicates that the terminal, if there is no available DMRS symbol in the time sub-window, supplements and transmits the DMRS in a preset time domain resource unit in the time sub-window after adjusting the DMRS bundling size to the window size of the time sub-window.

In an embodiment, the preset time domain resource unit includes a first time domain resource unit or a second time domain resource unit;

where the first time domain resource unit includes a preset symbol position of a target DMRS transmitted; and the second time domain resource unit includes a position where a M-th symbol of the target DMRS transmitted is offset by N symbol positions; where M and N are positive integers.

In an embodiment, configuration information of the preset time domain resource unit is sent to the terminal through at least one of the following:

an RRC signaling message, a MAC-CE signaling message, or a DCI signaling message.

The apparatus for configuring the parameter provided in the embodiments of the present disclosure may implement the various processes implemented in the method embodiments of FIGS. 1 to 5, which will not be repeated herein to avoid repetition.

For the apparatus for configuring the parameter provided in the present disclosure, the parameter information configuration module 601 configures the parameter information for the terminal and the parameter information includes at least one of the window size of a time window or the DMRS bundling size, such that the UE ensures the power consistency and the phase continuity within the same time window, thereby avoiding occurrence of a situation in which the phase continuity of joint channel estimation being destroyed.

The embodiments of the present disclosure also disclose a network device, including:

a parameter configuration module, configured to configure parameter information for a terminal; where the parameter information includes at least one of the following: a window size of a time window or a demodulation reference signal DMRS bundling size;

where the window size indicates a number of first time domain resource units included in the time window; and the DMRS bundling size indicates a number of second time domain resource units bundled with the DMRS;

the window size is greater than or equal to the DMRS bundling size.

The network device also includes modules in the apparatus for configuring the parameter in the above embodiments, which will not be repeated herein.

The embodiments of the present disclosure also disclose an apparatus for determining a parameter, as illustrated in FIG. 7, and the apparatus includes:

a parameter information determination module 701, configured to determine parameter information configured by a network device;

where the parameter information includes at least one of the following: a window size of a time window or a demodulation reference signal DMRS bundling size;

where the window size indicates a number of first time domain resource units included in the time window; and the DMRS bundling size indicates a number of second time domain resource units bundled with the DMRS;

the window size is greater than or equal to the DMRS bundling size.

In an embodiment, the parameter information determination module 701 is configured to perform at least one of the following:

receiving the parameter information sent by the network device through a preset signaling message; and determining the parameter information in correspondence with a resource parameter of a preset transmission resource and/or the preset transmission resource.

In an embodiment, the preset signaling message includes at least one of the following:

a radio resource control layer RRC signaling message, a media access control-control element MAC-CE signaling message, or a downlink control information DCI signaling message.

In an embodiment, the parameter information determination module 701 includes:

an acquisition sub-module, configured to acquire the parameter information carried in a target indication domain in the preset signaling message; where the target indication domain includes at least one of a preset indication domain or a newly-added indication domain.

In an embodiment, the preset transmission resource includes at least one of a physical uplink control channel PUCCH resource or a physical uplink shared channel PUSCH resource.

In an embodiment, the resource parameter of the preset transmission resource includes at least one of the following: a repetition parameter Repetition, a time-domain frequency hopping interval, or an uplink-downlink slot structure configuration.

In an embodiment, the apparatus includes:

a receiving module, configured to receive first indication information, and divide, if there is an unavailable interval in the time window and duration of the unavailable interval is greater than or equal to a first preset threshold, the time window into at least two time sub-windows.

In an embodiment, the apparatus further includes:

an adjustment module, configured to adjust, if a window size of the time sub-window is smaller than the DMRS bundling size, the DMRS bundling size to the window size of the time sub-window.

In an embodiment, the apparatus further includes:

a transmission module, configured to, if there is no available DMRS symbol in the time sub-window, supplement and transmit a target DMRS in a preset time domain resource unit.

In an embodiment, the preset time domain resource unit includes a first time domain resource unit or a second time domain resource unit;

where the first time domain resource unit includes a preset symbol position of a target DMRS transmitted; and the second time domain resource unit includes a position where a M-th symbol of the target DMRS transmitted is offset by N symbol positions; where M and N are positive integers.

In an embodiment, configuration information of the preset time domain resource unit is preset or acquired at least one of the following signaling messages sent by the network device: an RRC signaling message, a MAC-CE signaling message, or a DCI signaling message.

In the embodiments of the present disclosure, the parameter information determination module 701 determines parameter information configured by the network device and subsequently, at least one of the window size of the time window and the DMRS bundling size included in the parameter information is transmitted based on the parameter information, such that the UE ensures the power consistency and the phase continuity within the same time window, thereby avoiding occurrence of a situation in which the phase continuity of joint channel estimation being destroyed.

The embodiments of the present disclosure also disclose a terminal, including:

a parameter determination module, configured to determine parameter information configured by a network device;

where the parameter information includes at least one of the following: a window size of a time window or a demodulation reference signal DMRS bundling size;

where the window size indicates a number of first time domain resource units included in the time window; and the DMRS bundling size indicates a number of second time domain resource units bundled with the DMRS;

the window size is greater than or equal to the DMRS bundling size.

The terminal also includes modules in the apparatus for determining the parameter in the above embodiments, which will not be repeated herein.

Based on the same principle as the method illustrated in the embodiments of the present disclosure, the embodiments of the present disclosure also disclose an electronic device, which may include but not be limited to: a processor and a memory; where the memory is configured to store a computer program; and the processor is configured to perform the method for configuring the parameter and method for determining the parameter illustrated in any embodiment of the present disclosure by calling the computer program.

Figure 8:
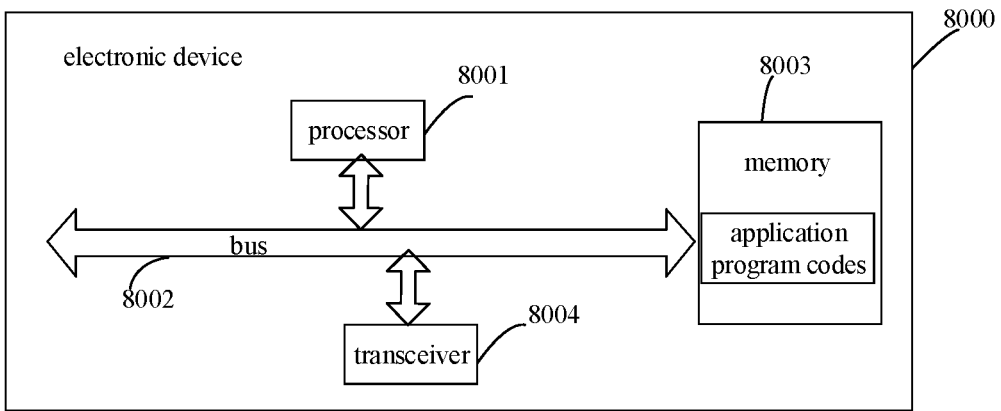
FIG. 8 is a structural schematic diagram of an electronic device provided in an embodiment of the present disclosure.

In an embodiment, an electronic device is provided. As shown in FIG. 8, the electronic device 8000 shown in FIG. 8 may be a server, and includes a processor 8001 and a memory 8003. The processor 8001 and the memory 8003 are connected, for example, connected through a bus 8002. In an embodiment, the electronic device 8000 may further include a transceiver 8004. It should be noted that in actual applications, the transceiver 8004 is not limited to one, and the structure of the electronic device 8000 does not constitute a limitation to embodiments of the present disclosure.

The processor 8001 may be a central processing unit (CPU), a general-purpose processor, a digital signal processor (DSP), an application specific integrated circuit (ASIC), a field programmable gate array (FPGA) or other programmable logic device, a transistor logic device, a hardware component, or any combination thereof. It may implement or execute various exemplary logical blocks, modules, and circuits described in conjunction with embodiments of the present disclosure. The processor 8001 may also be a combination for realizing computing functions, for example, including a combination of one or more microprocessors, a combination of a DSP and a microprocessor, or the like.

The bus 8002 may include a path for transferring information among the above-mentioned components. The bus 8002 may be a peripheral component interconnect (PCI) bus or an extended industry standard architecture (EISA) bus or the like. The bus 8002 may be divided into an address bus, a data bus, a control bus, or the like. For ease of representation, only one thick line is used in FIG. 8, but it does not mean that there is only one bus or one type of bus.

The memory 8003 may be a read only memory (ROM) or other types of static storage devices that may store static information and instructions, a random access memory (RAM) or other types of dynamic storage devices that may store information and instructions, an electrically erasable programmable read only memory (EEPROM), a compact disc read only memory (CD-ROM) or other optical disk storage, an optical disk storage (including compressed optical discs, laser discs, optical discs, digital universal discs, Blu-ray discs, etc.), a magnetic disk storage medium or other magnetic storage devices, or any other medium that may be used to carry or store desired program codes in the form of instructions or data structures and may be accessed by a computer, but not limited to this.

The memory 8003 is used to store application program codes for executing solutions of embodiments of the present disclosure, and application program codes are controlled and performed by the processor 8001. The processor 8001 is configured to execute the application program codes stored in the memory 8003 to implement the content shown in the foregoing method embodiments.

The electronic device includes but is not limited to: a mobile terminal such as a mobile phone, a notebook computer, a digital broadcast receiver, a personal digital assistant (PDA), a tablet computer (PAD), a portable multimedia player (PMP), a vehicle terminal (such as a vehicle navigation terminal) or the like, and a fixed terminal such as a digital TV or a desktop computer. The electronic device shown in FIG. 8 is only an example, and should not bring any limitation to the function and scope of embodiments of the present disclosure.

The server provided by the present disclosure may be an independent physical server, or may be a server cluster including a plurality of physical servers or a distributed system, or may be a cloud server providing basic cloud computing services, such as a cloud database, a cloud service, cloud computing, a cloud function, cloud storage, a network service, cloud communication, a middleware service, a domain name service, a security service, a content delivery network (CDN), big data, and an artificial intelligence platform. The terminal device may be a smartphone, a tablet computer, a notebook computer, a desktop computer, a smart speaker, a smart watch and the like, but it is not limited to this. The terminal and the server may be directly or indirectly connected via the wired or wireless communication, which is not limited in the present disclosure.

The embodiments of the present disclosure provide a computer-readable storage medium with a computer program stored on the computer-readable storage medium, and when the computer program runs on a computer, the computer may execute the corresponding content in the foregoing method embodiments.

It should be understood that although various steps in flowcharts of drawings are displayed in sequence as indicated by arrows, these steps are not necessarily performed in sequence in an order indicated by the arrows. Unless explicitly stated in the present disclosure, the execution of these steps is not strictly limited in the order, and they may be executed in other orders. Moreover, at least part of the steps in flowcharts of drawings may include multiple sub-steps or multiple stages. These sub-steps or stages are not necessarily executed at the same time, but may be executed at different moments. The execution order is not necessarily sequential, but they may be performed alternately or alternately with at least a part of other steps or sub-steps or stages of other steps.

It should be noted that the aforementioned computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, device, or apparatus, or a combination thereof. A more specific example of the computer-readable storage medium may include, but not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as a part of a carrier wave, and a computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium may be transmitted by any suitable medium, including but not limited to: wire, optical cable, radio frequency (RF), or the like, or any suitable combination thereof.

The above-mentioned computer-readable medium may be included in the above-mentioned electronic device; or it may exist alone without being assembled into the electronic device.

The foregoing computer-readable medium carries one or more programs, and when the one or more programs are executed by the electronic device, the electronic device is caused to execute the method shown in the foregoing embodiments.

According to an aspect of the present disclosure, a computer program product or a computer program is disclosed, the computer program product or the computer program includes computer instructions, the computer instructions being stored in a computer-readable storage medium. A processor of a computer device reads the computer instructions from the computer-readable storage medium, and executes the computer instructions, to cause the computer device to perform the method for configuring the parameter, the method for determining the parameter provided in the various optional implementation methods mentioned above.

The computer program code used to perform the operations of the present disclosure may be written in one or more programming languages or a combination thereof. The above-mentioned programming languages include object-oriented programming languages, such as Java, Smalltalk, C++, and also conventional procedural programming languages, such as "C" language or similar programming language. The program code may be executed entirely on the user's computer, partly on the user's computer, executed as an independent software package, partly on the user's computer and partly executed on a remote computer, or entirely executed on the remote computer or server. In the case of the remote computer, the remote computer may be connected to the user's computer through any kind of network, including a local area network (LAN) or a wide area network (WAN), or it may be connected to an external computer (for example, using an Internet connection provided by an Internet service provider).

The flowcharts and block diagrams in the accompanying drawings illustrate the possible implementation architecture, functions, and operations of the systems, methods, and computer program products according to various embodiments of the present disclosure. In this regard, each block in the flowchart or block diagram may represent a module, program segment, or part of codes, and the module, program segment, or part of codes contains one or more executable instructions for realizing the specified logic function. It should also be noted that, in some alternative implementations, the function marked in the block may also occur in a different order from the order marked in the drawing. For example, two blocks shown in succession may actually be executed substantially in parallel, and they may sometimes be executed in the reverse order, depending on the functions involved. It should also be noted that each block in the block diagram and/or flowchart, and a combination of blocks in the block diagram and/or flowchart, may be implemented by a dedicated hardware-based system that performs the specified functions or operations or by a combination of dedicated hardware and computer instructions.

The modules involved in the described embodiments of the present disclosure may be implemented in software or hardware. The name of the module does not constitute a limitation on the module itself under certain circumstances. For example, A module may also be described as "A module configured to perform B operation".

The above description is only preferred embodiments of the present disclosure and an explanation of the applied technical principles. Those skilled in the art should understand that the scope involved in this disclosure is not limited to the technical solutions formed by the specific combination of the above technical features, and should also cover the other technical solutions, without departing from the above disclosed concept, formed by arbitrarily combining the above technical features or the equivalent features. For example, the above-mentioned features and the technical features disclosed in the present disclosure (but not limited to) having similar functions are replaced with each other to form the technical solutions.

What is claimed is:

1. A method for configuring a parameter, performed by a network device, comprising:

configuring parameter information for a terminal; wherein the parameter information comprises at least one of the following: a window size of a time window and a demodulation reference signal (DMRS) bundling size;

wherein the window size indicates a number of first time domain resource units included in the time window; the DMRS bundling size indicates a number of second time domain resource units bundled with the DMRS; and the window size is greater than or equal to the DMRS bundling size;

wherein the parameter information further comprises first indication information;

wherein the first indication information indicates that the terminal, in response to determining that there is an unavailable interval in the time window and a duration of the unavailable interval is greater than or equal to a first preset threshold, divides the time window into at least two time sub-windows.

2. The method according to claim 1, wherein after configuring the parameter information for the terminal, the method comprises at least one of the following:

sending the parameter information to the terminal through a preset signaling message; and setting the parameter information in correspondence with at least one of a resource parameter of a preset transmission resource and the preset transmission resource.

3. The method according to claim 1, wherein the method comprises sending the parameter information to the terminal through a preset signaling message, wherein the preset signaling message comprises at least one of the following:

a radio resource control (RRC) layer signaling message, a media access control-control element (MAC-CE) signaling message, or a downlink control information (DCI) signaling message.

4. The method according to claim 1, wherein the method comprises sending the parameter information to the terminal through a preset signaling message, and sending the parameter information to the terminal through the preset signaling message comprises:

carrying the parameter information in a target indication domain in the preset signaling message, and sending the preset signaling message to the terminal; wherein the target indication domain comprises at least one of a preset indication domain and a newly-added indication domain.

5. The method according to claim 1, wherein the method comprises setting the parameter information in correspondence with at least one of a resource parameter of a preset transmission resource and the preset transmission resource, wherein the preset transmission resource comprises at least one of a physical uplink control channel (PUCCH) resource and a physical uplink shared channel (PUSCH) resource.

6. The method according to claim 1, wherein the method comprises setting the parameter information in correspondence with at least one of a resource parameter of a preset transmission resource and the preset transmission resource, wherein the resource parameter of the preset transmission resource comprises at least one of the following: a repetition parameter, a time-domain frequency hopping interval, and an uplink-downlink slot structure configuration.

7. The method according to claim 1, wherein the first indication information further indicates that the terminal, in response to determining that a window size of the time sub-window is smaller than the DMRS bundling size, adjusts the DMRS bundling size to the window size of the time sub-window after dividing the time window into the at least two time sub-windows.

8. The method according to claim 7, wherein the first indication information further indicates that the terminal, in response to determining that there is no available DMRS symbol in the time sub-window, supplements and transmits a target DMRS in a preset time domain resource unit in the time sub-window after adjusting the DMRS bundling size to the window size of the time sub-window.

9. The method according to claim 8, wherein the preset time domain resource unit comprises a first time domain resource unit or a second time domain resource unit;

wherein the first time domain resource unit comprises a preset symbol position of the target DMRS transmitted; and the second time domain resource unit comprises a position where a M-th symbol of the target DMRS transmitted is offset by N symbol positions; wherein M and N are positive integers.

10. The method according to claim 8, wherein configuration information of the preset time domain resource unit is sent to the terminal through at least one of the following:

an RRC signaling message, a MAC-CE signaling message, and a DCI signaling message.

11. A method for determining a parameter, performed by a terminal, comprising:

determining parameter information configured by a network device;

wherein the parameter information comprises at least one of the following: a window size of a time window and a demodulation reference signal (DMRS) bundling size;

wherein the window size indicates a number of first time domain resource units included in the time window; the DMRS bundling size indicates a number of second time domain resource units bundled with the DMRS; and the window size is greater than or equal to the DMRS bundling size;

wherein after determining the parameter information configured by the network device, the method comprises:

receiving first indication information, and dividing, in response to determining that there is an unavailable interval in the time window and a duration of the unavailable interval is greater than or equal to a first preset threshold, the time window into at least two time sub-windows.

12. The method according to claim 11, wherein determining the parameter information configured by the network device comprises at least one of the following:

receiving the parameter information sent by the network device through a preset signaling message; or determining the parameter information in correspondence with a resource parameter of a preset transmission resource and/or the preset transmission resource.

13. The method according to claim 11, wherein determining the parameter information configured by the network device comprises receiving the parameter information sent by the network device through a preset signaling message, wherein receiving the parameter information sent by the network device through the preset signaling message comprises:

acquiring the parameter information carried in a target indication domain in the preset signaling message; wherein the target indication domain comprises at least one of a preset indication domain and a newly-added indication domain.

14. The method according to claim 11, wherein after dividing the time window into the at least two time sub-windows, the method further comprises:

adjusting, in response to determining that a window size of the time sub-window is smaller than the DMRS bundling size, the DMRS bundling size to the window size of the time sub-window.

15. The method according to claim 11, wherein after dividing the time window into the at least two time sub-windows, the method further comprises:

supplementing and transmitting, in response to determining that there is no available DMRS symbol in the time sub-window, a target DMRS in a preset time domain resource unit.

16. The method according to claim 15, wherein the preset time domain resource unit comprises a first time domain resource unit or a second time domain resource unit;

wherein the first time domain resource unit comprises a preset symbol position of the target DMRS transmitted; and the second time domain resource unit comprises a position where a M-th symbol of the target DMRS transmitted is offset by N symbol positions; wherein M and N are positive integers.

17. The method according to claim 15, wherein configuration information of the preset time domain resource unit is preset or acquired from at least one of the following signaling messages sent by the network device: an RRC signaling message, a MAC-CE signaling message, and a DCI signaling message.

18. An electronic device comprising: a memory, a processor, and a computer program stored in the memory and capable of running on the processor, wherein when the computer program is executed by the processor, the processor is configured to:

configure parameter information for a terminal; wherein the parameter information comprises at least one of the following: a window size of a time window and a demodulation reference signal (DMRS) bundling size;

wherein the window size indicates a number of first time domain resource units included in the time window; the DMRS bundling size indicates a number of second time domain resource units bundled with the DMRS; and the window size is greater than or equal to the DMRS bundling size;

wherein the parameter information further comprises first indication information;

wherein the first indication information indicates that the terminal, in response to determining that there is an unavailable interval in the time window and a duration of the unavailable interval is greater than or equal to a first preset threshold, divides the time window into at least two time sub-windows.

*    *    *    *    *